United States Patent
Chiang et al.

(10) Patent No.: US 7,762,670 B2
(45) Date of Patent: Jul. 27, 2010

(54) PROJECTOR AND IMAGE GENERATING METHOD THEREOF

(75) Inventors: Chen-Cheng Chiang, Tai-Chung (TW); Chang-Hung Lee, Yun-Lin Hsien (TW)

(73) Assignee: BenQ Corporation, Taipei (TW)

( * ) Notice: Subject to any disclaimer, the term of this patent is extended or adjusted under 35 U.S.C. 154(b) by 1211 days.

(21) Appl. No.: 11/306,056

(22) Filed: Dec. 15, 2005

(65) Prior Publication Data

US 2006/0242265 A1 Oct. 26, 2006

(30) Foreign Application Priority Data

Dec. 15, 2004 (TW) .............................. 93138950 A

(51) Int. Cl.
*G03B 21/26* (2006.01)
*G03B 23/00* (2006.01)
(52) U.S. Cl. .......................................... 353/30; 353/25
(58) Field of Classification Search .................. 353/15, 353/30; 348/565, 581; 349/5, 7, 8, 9, 10
See application file for complete search history.

(56) References Cited

U.S. PATENT DOCUMENTS 7,486,337 B2 * 2/2009 Bian ........................ 348/589

FOREIGN PATENT DOCUMENTS

CN 1476242 2/2004

* cited by examiner

*Primary Examiner*—Georgia Y Epps
*Assistant Examiner*—Danell L Owens

(57) ABSTRACT

A projector for projecting an image is disclosed. The projector includes a memory device containing a plurality of memory blocks for storing a plurality of image data respectively corresponding to different image sources; an integrating module coupled to the memory device for selectively reading the plurality of image data from the memory device, and for integrating at least two image data read from the memory device into an image data stored in the memory device corresponding to the image; and a projecting module for projecting the image.

7 Claims, 5 Drawing Sheets

PROJECTOR AND IMAGE GENERATING METHOD THEREOF

BACKGROUND OF THE INVENTION

1. Field of the Invention

The present invention relates to a projector and a related image forming method, and more specifically, to a projector capable of serving a plurality of image sources and a related image forming method.

2. Description of the Prior Art

The operation theory of projectors is similar to that of devices for displaying slides or transparencies; i.e. in both of the above-mentioned devices a high brightness/luminance light bulb is utilized as a light source, and the content to be displayed is projected on a white display curtain or a wall. In addition, because a projector provides several different image transmission interfaces, the projector can receive data transmitted by digital or analogue image sources, such as a computer or a television, and project the transmitted images on a white display curtain or a wall, enlarging the image scale and therefore enabling many people to see them. For this reason, projectors are usually utilized in large-scale meetings or home theaters. Modern projectors have become portable, and both size and price have been reduced, therefore giving them great potential in the current market.

Projectors in the current market are generally only capable of receiving images from a single image source. Even if a projector capable of connecting to different image sources simultaneously is utilized, only one image transmitted from one single image source can be displayed at any one time, meaning the user needs to control the projector to switch to different image sources to allow the different images to be seen. Different images at the same time still cannot be seen, however. To enable the user to see images from different image sources at the same time, it is necessary to utilize an external integrating system to integrate images from different image sources into a single image, to transmit the single integrated image to the projector and then to project the single integrated image.

SUMMARY OF THE INVENTION

One of the objectives of the claimed invention is therefore to provide a projector for displaying a plurality of images from a plurality of image sources and an image forming method thereof.

According to the claimed invention, a projector for projecting an image is disclosed. The projector comprises: a memory device comprising a plurality of memory blocks for storing a plurality of image data corresponding to different image sources respectively; an integrating module coupled to the memory device for selectively reading the plurality of image data from the memory device, and for integrating at least two image data read from the memory device into an image data stored in the memory device corresponding to the image; and a projecting module for projecting the image.

According to the claimed invention, a projector is disclosed. The projector comprises: a transceiving module for receiving a first image data and a second image data; an integrating module for integrating the first image data and the second image data into an image data corresponding to an image according to a first combination; and a projecting module for projecting the image.

Furthermore, according to the claimed invention, an image forming method applied in a projector for projecting an image is disclosed. The image forming method comprises: providing a memory device and storing a plurality of image data into a plurality of memory blocks in the memory device, wherein the plurality of image data correspond to a plurality of image sources respectively; selectively reading the plurality of image data from the memory device, and integrating at least two image data read from the memory device into an image data stored in the memory device corresponding to the image; and projecting the image.

Therefore, the claimed invention utilizes an integrating module to integrate a plurality of image data corresponding to different image sources into a single image to simultaneously display the plurality of image data and to adjust the relative positions and sizes of the plurality of image data according to different combinations.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
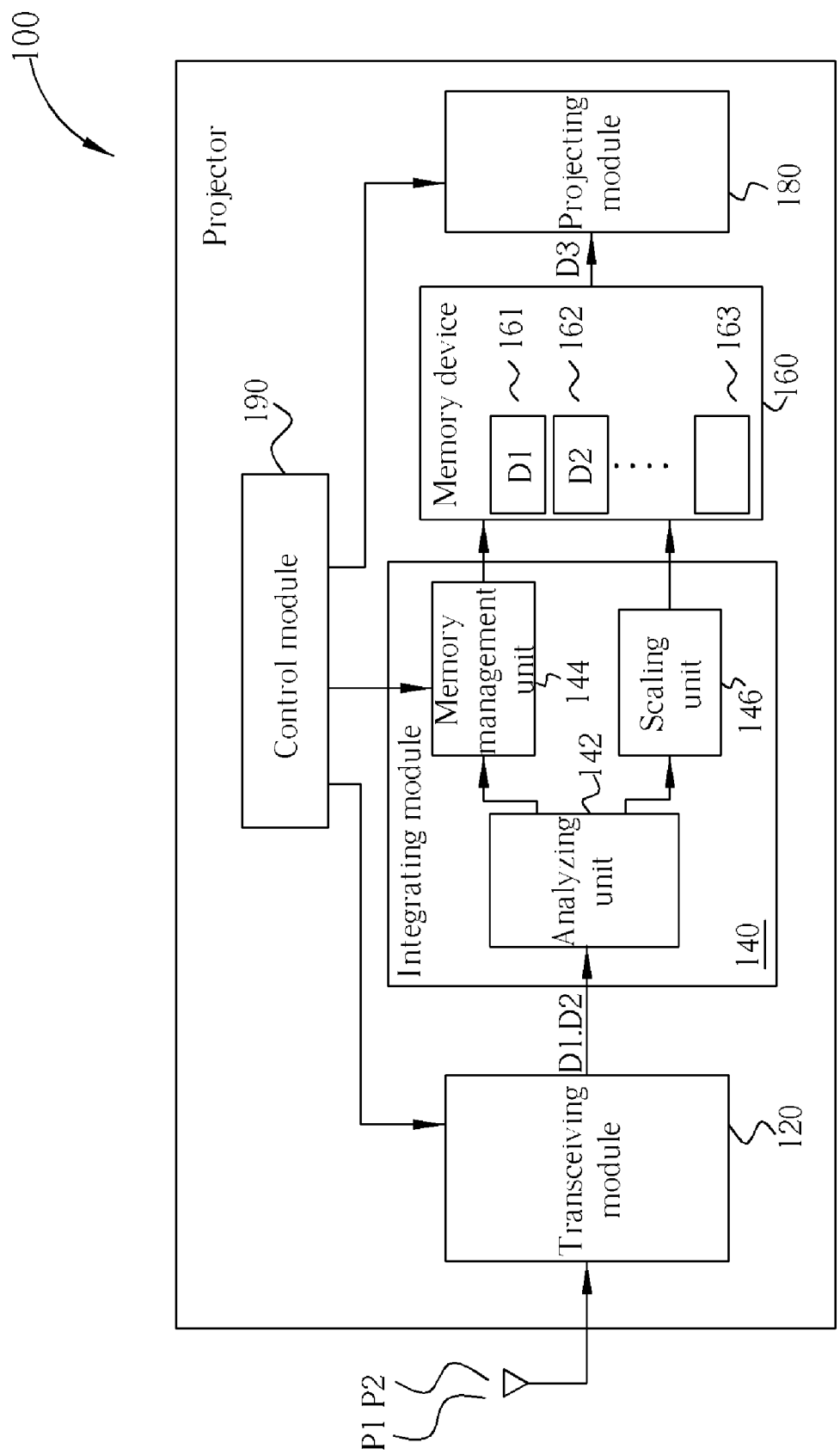
FIG. 1 is a block diagram of a first embodiment of a projector according to the present invention.

Please refer to FIG. 1. FIG. 1 is a block diagram of a first embodiment of a projector 100 according to the present invention. As shown in FIG. 1, the projector 100 comprises a transceiving module 120, an integrating module 140, a memory device 160 comprising a plurality of memory blocks 161, 162, ... 163, a projecting module 180 and a control module 190. In the present embodiment, the transceiving module 120 can be a wireless access device for transceiving packages with image sources S1, S2 (not shown), as in wireless communication. For example, the image source S1 could be a computer in which a wireless network card is installed, and the image source S2 could be a personal digital assistant (PDA) in which a wireless network card is installed. After the transceiving module 120 receives packages P1, P2 respectively from the image sources S1, S2, it is necessary to retrieve image data D1, D2 from the packages P1, P2 respectively and to read headers of the packages P1, P2 to determine the source of each package (i.e. the image sources S1, S2). Next, the integrating module 140 appropriately scales and adjusts the image data D1, D2 and stores the scaled and adjusted image data D1, D2 into the corresponding memory blocks 161, 162 respectively to form an integrated image data D3. Finally, the projecting module 180 reads the image data D3 from the memory device 160 and projects an image corresponding to the image data D3. Please note that the image data D3 contains the image data D1, D2 and other image data stored in the memory device 160. It should be noted that the image sources in the present invention are not limited to computers or PDAs, and other software or hardware capable of providing digital image data can be utilized as image sources in the present invention. That is, the above-mentioned image source could be a specific program executed by a personal computer, where only the image from the specific window is displayed.

Please refer to FIG. 1 again. The integrating module 140 comprises an analyzing unit 142, a memory management unit 144 and a scaling unit 146. To illustrate the function of these devices, reception of the package P1 is used as an example. After the transceiving module 120 receives the package P1, the analyzing unit 142 determines that the package P1 is transmitted by the image source S1 according to the header of the package P1. Next, the transceiving module 120 references a registration table to check if the connection between the image source S1 and the projector 100 has been successfully established. If the reference result indicates that the image source S1 has registered, the analyzing unit 142 directly transmits the image data D1 to the scaling unit 146. Afterwards, the scaling unit 146 scales the image data D1 according to the size of the memory block corresponding to the image source S1, matching the number of pixels of the scaled image data D1 with the size of the memory block. Finally, the scaled image data D1 are stored into the memory block. If the query result indicates that the connection with image source S1 has not been established yet, the analyzing unit 142 drives the transceiving module 120 to perform a three-way handshaking operation on the image source S1 to complete establishment of the connection, and the analyzing unit 142 then records the completion of the connection establishment in the above-mentioned registration table. Afterwards, the analyzing unit 142 informs the memory management unit 144 to allocate a memory block in the memory device 160 for the image source S1, and then the analyzing unit 142 transmits the image data D1 to the scaling unit 146 so that the following scaling and storing operations can be performed.

In addition, the control module 190 is utilized for receiving a control signal triggered by pressing a panel board of the projector, or a control signal transmitted by a remote control, and for controlling the transceiving module 120, the integrating module 140 and the projecting module 180 according to the received control signal. A user can control the memory management unit 140 to adjust memory blocks corresponding to different image sources according to the transmitted control signal, in order to further adjust the relative positions and sizes of the plurality of sub-images corresponding to different image sources. The user also can utilize the control signal to inform the transceiving module 120 to suspend processing of an image data of a specific image source. Alternatively, the user can end a connection with a specific image source, selectively control the sub-image corresponding to the image source to remain in the final image, or utilize the control signal to adjust the task setting of the projecting module 180, such as a focal length or a size of the projected image.

Figure 2:
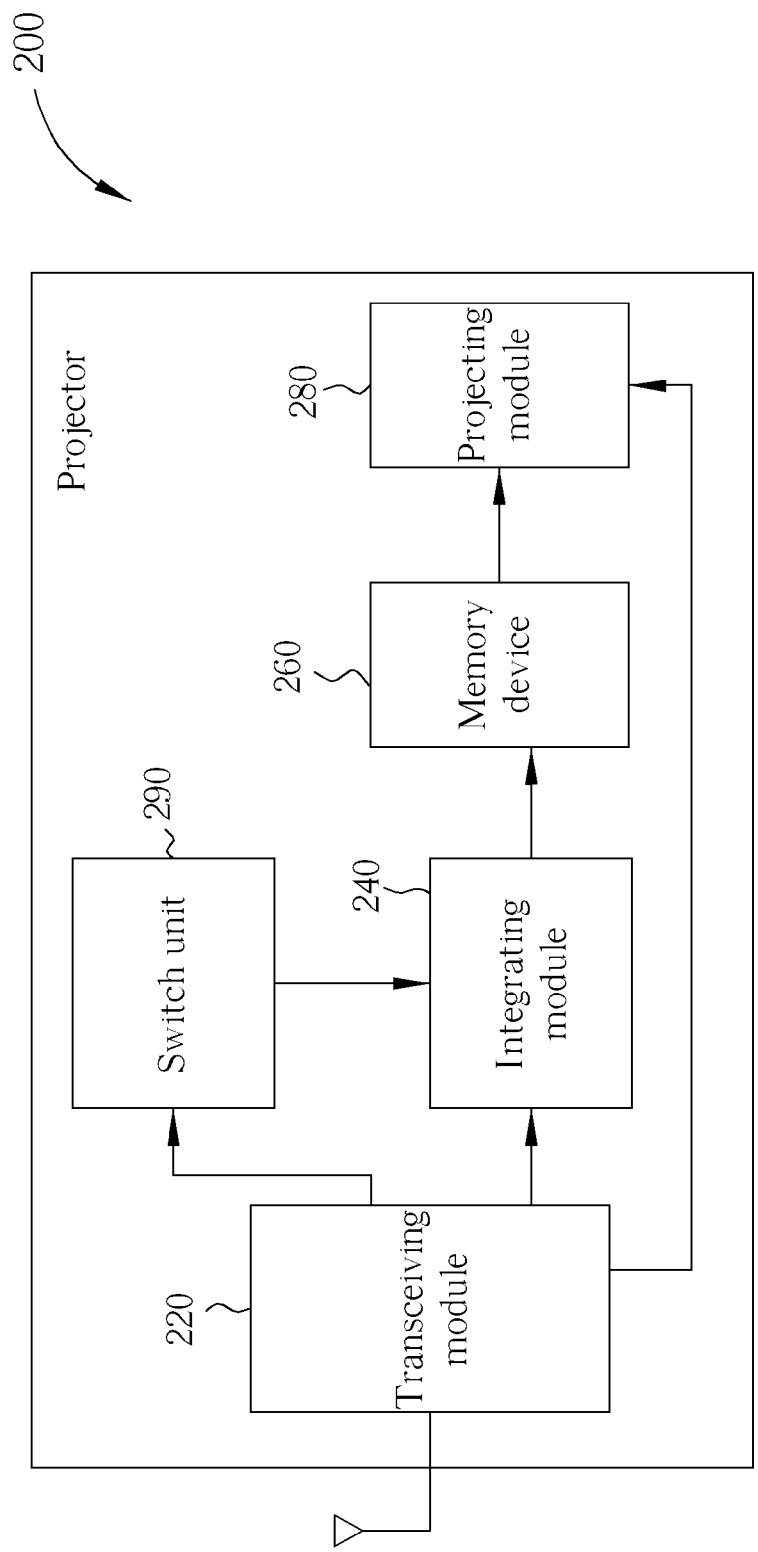
FIG. 2 is a block diagram of a second embodiment of a projector according to the present invention.

Please refer to FIG. 2. FIG. 2 is a block diagram of a second embodiment of a projector 200 according to the present invention. The projector 200 comprises a transceiving module 220, an integrating module 240, a memory device 260, a projecting module 280, and a switch unit 290, wherein functions and structures of the transceiving module 220, integrating module 240, the memory device 260 and the projecting module 280 are similar to those components with the same names shown in FIG. 1. Hence, the detailed descriptions of the transceiving module 220, the integrating module 240, the memory device 260 and the projecting module 280 are not included in the following paragraph. The only difference between the above-mentioned components in FIG. 1 and FIG. 2 is that the switch unit 290 receives a package through the transceiving module 220 and accesses a control signal from the package, in order to determine a combination for the plurality of the image data according to the control signal. This operation will be described in the following paragraph. The integrating module 240 is informed to adjust memory blocks corresponding to different image sources in the memory device 260 according to the determined combinations. Therefore, the projector 200 can determine which combination to utilize when combining several sub-images according to a package transmitted from an external control device, such as a computer. Additionally, in the present embodiment, the control signal in the package can be directly utilized to drive the projecting module 280 to change its task setting.

Figure 3:
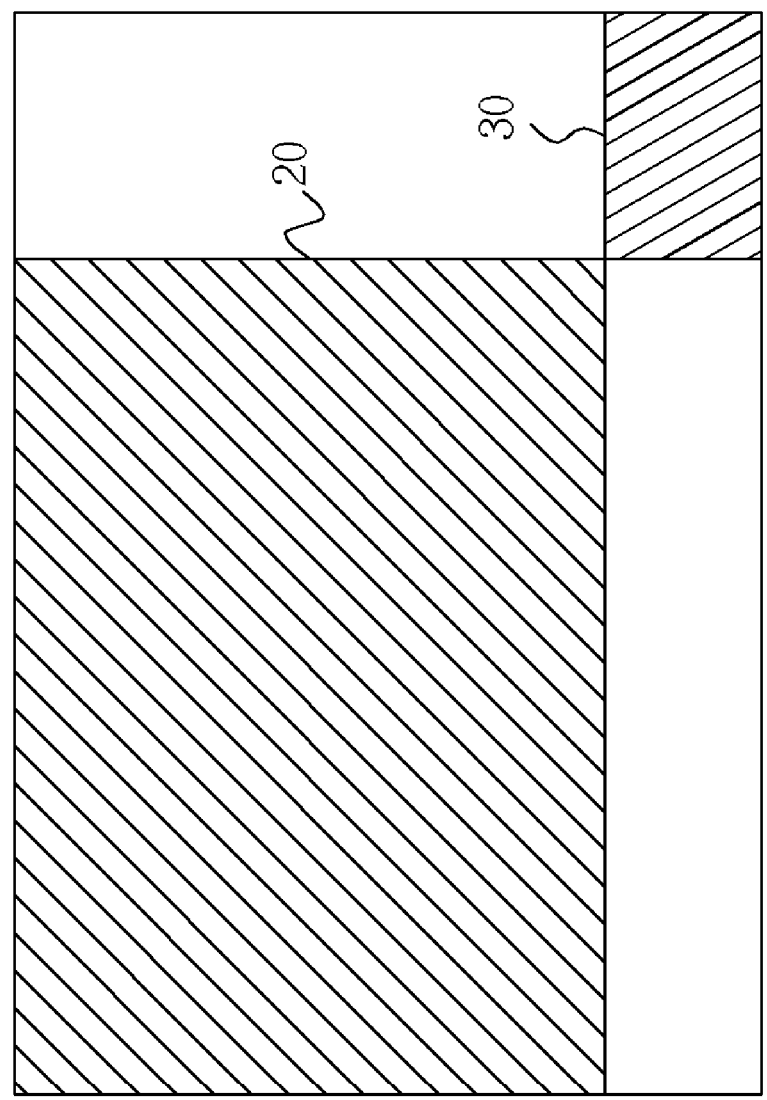
FIG. 3 is a diagram of a projected image generated by the projector shown in FIG. 2.

Please refer to FIG. 3. FIG. 3 is a diagram of a projected image 10 generated by the projector 200, wherein the projected image 10 corresponds to the image data D3. As shown in FIG. 3, the projected image 10 contains two sub-images 20 and 30, which are respectively utilized for displaying image data D1, D2 transmitted by the image sources S1, S2. The integrating module 240 separately scales the image data D1, D2 according to a combination CFG1. As shown in FIG. 3, the combination way CFG1 corresponds to two display ratios, 9/16 and 1/16, which respectively represent the ratios of the areas of the sub-images 20, 30 to the area of the projected image 10. Hence, the ratio of the area of the sub-image 20 to the area of the sub-image 30 is 9:1. Please note that in the present embodiment, the image data D1, D2 may contain all pixel data of the sub-images 20, 30. However, the image data D1, D2 can also be utilized for updating only a part of pixel data of the sub-images 20, 30.

Figure 4:
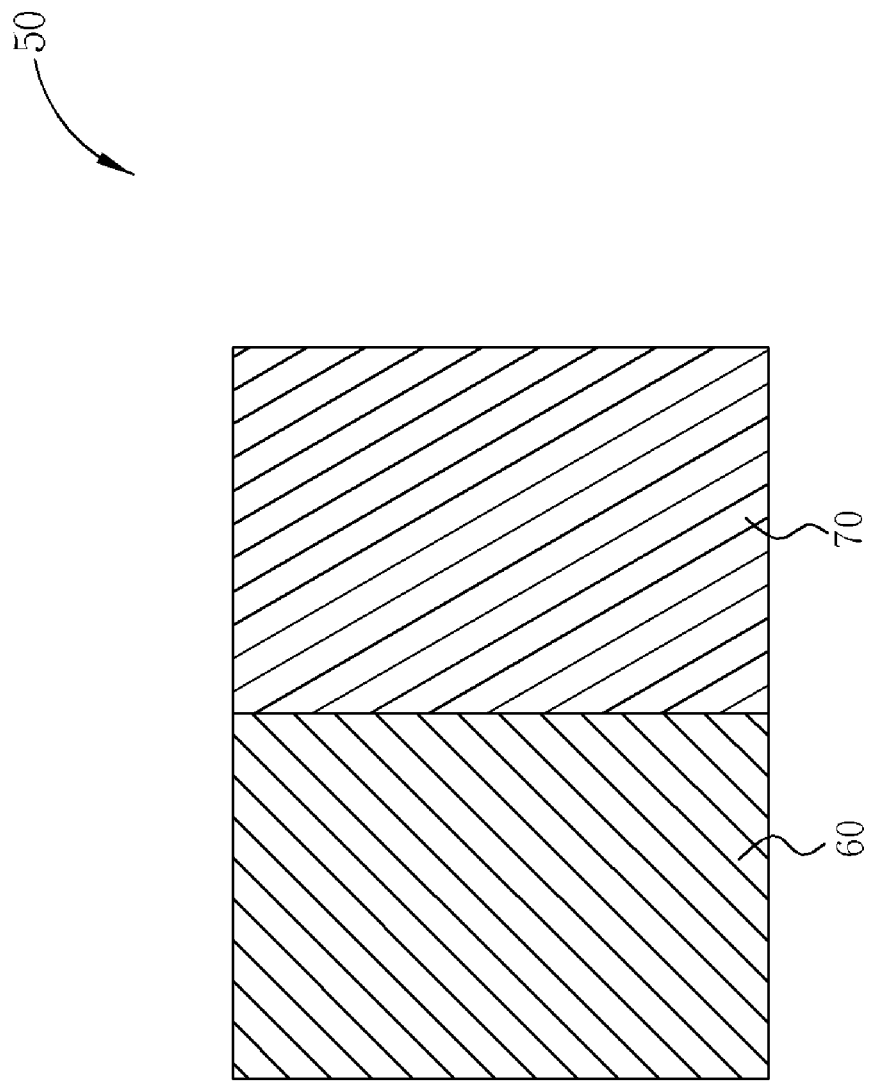
FIG. 4 is a diagram of another projected image generated by the projector shown in FIG. 2.

After the switch unit 290 receives a control signal, the switch unit 290 can provide another combination CFG2 for the integrating module 240. If the combination CFG2 shows that the two display ratios are ½ and ½ respectively, the integrating module 240 scales the mage data D1, D2 according to the display ratios ½ and ½ to generate a projected image 50. Please refer to FIG. 4. FIG. 4 is a diagram of the projected image 50. As shown in FIG. 4, the projected image 50 comprises two sub-images, sub-images 60 and 70, respectively utilized for displaying the image data D1, D2 of the image sources S1, S2, wherein the sub-images 60, 70 respectively occupy the left-hand part and the right-hand part of the projected image 50. Hence, if more combinations are built into the switch unit 290, all built-in combinations can be utilized for changing the relative positions and sizes of the sub-images 60, 70. Please note that more than two sub-images are able to be shown in the present embodiment. For example, when there are three sub-images, the three sub-images can be displayed according to display ratios ½, ¼, ¼, or display ratios ⅔, ⅙, ⅙.

Figure 5:
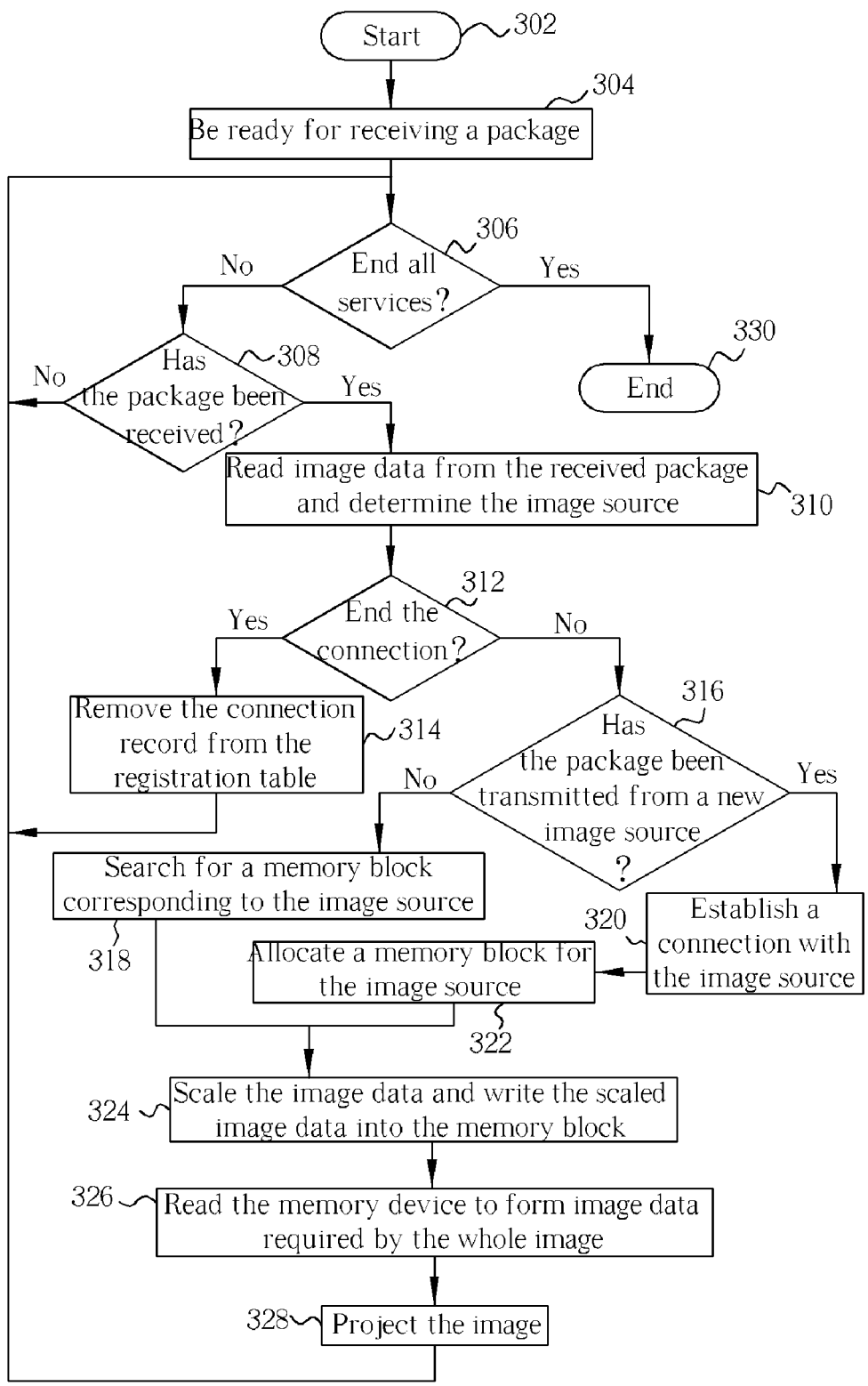
FIG. 5 is flowchart of an image forming method performed by the projector shown in FIG. 1 and the projector shown in FIG. 2.

Please refer to FIG. 5. FIG. 5 is a flowchart of an image forming method performed by the projector 100 shown in FIG. 1 and the projector 200 shown in FIG. 2. As shown in FIG. 5, the image forming method performed by the projectors comprises the following steps:

Step 302: Start.
Step 304: Be ready for receiving a package.
Step 306: End all services? If yes, proceed to step 330; otherwise, proceed to step 308.
Step 308: Has the package been received? If yes, proceed to step 310; otherwise, go back to step 306.
Step 310: Read image data from the received package and determine the image source.
Step 312: End the connection? If yes, proceed to step 314; otherwise, proceed to step 316.
Step 314: Remove the connection record from the registration table; go back to step 306.

Step 316: Has the package been transmitted from a new image source? If yes, proceed to step 320; otherwise, proceed to step 318;

Step 318: Search for a memory block corresponding to the image source in a memory device; proceed to step 324.

Step 320: Perform a three-way handshaking operation on the image source to establish a connection with the image source.

Step 322: Allocate a memory block for the image source after the connection has been successfully established.

Step 324: Scale the image data and write the scaled image data into the memory block.

Step 326: Read the memory device to form image data required by the whole image.

Step 328: Project the image; proceed back to step 306.

Step 330: End.

When the projector is powered on, the projector receives the package using the transceiving module, and then reads the image data and the information about the image source from the package. Next, the analyzing unit establishes a connection with the image source and informs the memory management unit to allocate a memory block for the image source. If the connection with the image source has been established, the scaling unit will scale the image data and write the scaled image data into the memory block. Finally, the projecting module can project the complete integrated image according to the integrated image data.

In contrast with the related art, the projector and the related image forming method according to the present invention utilize an integrating module to integrate a plurality of image data of different image sources into an image data stored in the memory device corresponding to an image, and generates a projected image according to the integrated image data to achieve a goal of simultaneously displaying a plurality of images from different image sources.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A projector for projecting an image, comprising:
a memory device containing a plurality of memory blocks for storing a plurality of image data corresponding to different image sources respectively;
an integrating module coupled to the memory device for selectively reading the plurality of image data from the memory device, and for integrating at least two image data read from the memory device into an image data stored in the memory device corresponding to the image;
a projecting module for projecting the image; and
a transceiving module for receiving a first image data and for determining a first image source corresponding to the first image data;
wherein the integrating module selects a first memory block corresponding to the first image source from the memory blocks to store the first image data in the first memory block,
wherein the integrating module comprises an analyzing unit for detecting if the first memory block exists in the memory device,
wherein if the detection result of the analyzing unit indicates that the first image source does not correspond to any memory block in the memory device, the analyzing unit transmits a response message to the first image source via the transceiving module to try to establish a connection between the projector and the first image source.

2. The projector of claim 1, wherein the integrating module further comprises:
a scaling unit for scaling the first image data to generate a second image data, and for storing the second image data in the first memory block.

3. The projector of claim 2, wherein the integrating module further comprises:
a memory management unit for allocating the first memory block in the memory device;
wherein when the connection between the projector and the first image source is established successfully, the memory management unit allocates the first memory block in the memory device for the first image source.

4. A projector for projecting an image, comprising:
a memory device containing a plurality of memory blocks for storing a plurality of image data corresponding to different image sources respectively;
an integrating module coupled to the memory device for selectively reading the plurality of image data from the memory device, and for integrating at least two image data read from the memory device into an image data stored in the memory device corresponding to the image;
a projecting module for projecting the image;
a transceiving module for receiving a first image data and for determining a first image source corresponding to the first image data; and
a control module, coupled to the integrating module and the projecting module, for receiving a first control signal to control a task setting of the projecting module, and for receiving a second control signal to control the integrating module to adjust the plurality of image data of a plurality of pictures recorded by the memory device, wherein the task setting represents the ratios of the areas of the plurality of pictures to the area of the image;
wherein the integrating module selects a first memory block corresponding to the first image source from the memory blocks to store the first image data in the first memory block,
wherein after the control module receives a third control signal, the control module controls the transceiving module to disconnect the connection between the transceiving module and a specific image source.

5. An image forming method applied in a projector for projecting an image, comprising:
providing a memory device and storing a plurality of image data into a plurality of memory blocks in the memory device, wherein the plurality of image data correspond to a plurality of image sources respectively;
selectively reading the plurality of image data from the memory device, and integrating at least two image data read from the memory device into an image data stored in the memory device corresponding to the image;
projecting the image;
receiving a first image data and
determining a first image source corresponding to the first image data;
wherein the first image source corresponds to a first memory block in the memory blocks for storing the first image data,
wherein the step of integrating the image data comprises:
detecting if the first memory block exists in the memory device; and
transmitting a response message to the first image source to try to establish a connection between the projector and the first image source if the detection result indicates that the first image source does not correspond to any memory block in the memory device.

6. The image forming method of claim 5, wherein the step of integrating the image data further comprises:

scaling the first image data to generate a second image data and storing the second image data in the first memory block if a detection result indicates that the first image source corresponds to the first memory block.

7. The image forming method of claim 5, further comprising:

receiving a first control signal to control a task setting of a projecting module of the projector; and receiving a second control signal to adjust the plurality of image data of a plurality of pictures recorded by the memory device;

wherein the task setting is utilized for representing the ratios of the areas of the plurality of pictures to the area of the image.

* * * * *